United States Patent [19]
Fujimoto

[11] Patent Number: 6,155,632
[45] Date of Patent: Dec. 5, 2000

[54] CONSTRUCTION MACHINE

[75] Inventor: Satoshi Fujimoto, Hiroshima, Japan

[73] Assignee: Kabushiki Kaisha Kobe Seiko Sho, Kobe, Japan

[21] Appl. No.: 09/227,354

[22] Filed: Jan. 8, 1999

[30] Foreign Application Priority Data

Jan. 9, 1998 [JP] Japan .................................. 10-014949

[51] Int. Cl.⁷ ..................................................... B60J 7/00
[52] U.S. Cl. ............................... 296/190.08; 296/190.05; 180/89.13
[58] Field of Search ......................... 296/190.01, 190.03, 296/190.04, 190.05, 190.08; 180/89.12, 89.13, 89.16, 89.17, 89.18, 89.19

[56] References Cited

U.S. PATENT DOCUMENTS

| | | |
|---|---|---|
| 4,079,985 | 3/1978 | Martin .................................... 296/28 C |
| 4,221,274 | 9/1980 | Martin, Jr. ............................. 180/69 R |
| 4,613,183 | 9/1986 | Kesling ................................... 296/183 |
| 4,616,872 | 10/1986 | Akira et al. ............................. 296/190 |
| 5,016,721 | 5/1991 | Yamamoto et al. .................. 180/89.13 |
| 5,199,193 | 4/1993 | Akiba et al. ............................... 37/341 |
| 5,931,247 | 8/1999 | Peterson ............................... 180/89.13 |

*Primary Examiner*—Joseph D. Pape
*Attorney, Agent, or Firm*—Oblon, Spivak, McClelland, Maier & Neustadt, P.C.

[57] ABSTRACT

In a conventional hydraulic excavator, a fixed hood is provided between a cabin and an engine hood. This is for protecting devices from contact with raindrops and obstacles. However, a guard is needed as an extra component, with consequent increase in the number of components and deterioration of productivity. Also in point of appearance, the machine body looks poor because of joint portions. The present invention aims at providing a construction machine wherein a side wall of a cabin is extended backward to constitute a guard portion for covering, at least sideways, such devices as are disposed behind the cabin. The guard portion extends up to a sideways position of the devices. A lower portion of a rear wall of the cabin is recessed toward the inside of the cabin to form a space, allowing the devices to be positioned at least partially within the space.

4 Claims, 9 Drawing Sheets

FRONT ← → REAR

CONSTRUCTION MACHINE

BACKGROUND OF THE INVENTION

1. Field of the Invention

The present invention relates mainly to a structure of an upper rotating body having a cab, which is used in a construction machine such as a hydraulic excavator.

2. Description of the Prior Art

FIG. 7 is an entire side view of a back hoe described as an embodiment in Japanese Patent Laid Open No. 302739/96. In the same figure, numeral 5 denotes a rotating base of the back hoe, numeral 7 denotes a cabin, numeral 20 denotes a bonnet formed at a rear portion of the cabin 7, numeral 20a denotes an engine hood of the bonnet 20, and numeral 20c denotes a fixed hood. FIG. 8 is a plan view of the rotating base 5 shown in FIG. 7. In FIG. 8, numeral 24 denotes a rear panel of the cabin 7, numeral 18 denotes an engine, numeral 16 denotes a fuel tank, and numeral 17 denotes an oil tank (a hydraulic oil tank). FIG. 9 is a left side view of the cabin 7 shown in FIGS. 7 and 8. In FIG. 9, numeral 23 denotes a left side panel of the cabin 7, numeral 27 denotes an operator seat formed within the cabin 7, and numeral 36 denotes a seal member.

In the conventional back how shown in FIGS. 7 to 9, the rear portion of the cabin 7 is covered with the fixed hood 20c (shown in FIGS. 7 and 8) which serves as a guard. In the space surrounded by the fixed hood 20c, the rear wall of the cabin 7, the engine hood 20a and a counterweight, there are mounted such devices as a power source and hydraulic devices though not shown. In order to ensure a space behind the cabin 7, a lower portion of the rear wall of the cabin is inclined so as to protrude toward the inside of a cab.

According to this conventional back hoe, a space is formed in a rear lower portion of the cabin 7 to arrange devices therein, which space is connected to the interior of the fixed hood 20c. In a small-sized hydraulic excavator in which devices are compelled to be arranged in a narrow space, the said space serves as an effective space for the arrangement of devices therein.

In the above conventional back how, the fixed hood 20c is disposed between the cabin 7 and the engine hood 20a to protect the devices from contact with rain drops and obstacles and attain a pleasing appearance.

Such a conventional structure requires the provision of an additional guard (the fixed hood 20c in the conventional back hoe shown in FIGS. 7 and 8), thus resulting in an increase in the number of components used and hence deterioration of productivity. Moreover, the appearance of the machine body is deteriorated because of an increase in the number of joint portions, and a problem is encountered also in point of durability of the guard mounting portion.

For example, these problems may be solved if the engine hood 20a is extended up to the rear wall of the cabin 7. In this case, however, the engine hood 20a becomes larger in size and it extends into rear lower portions of side walls of the cabin 7. Such a shape is presumed to make opening and closing of the engine hood difficult. Besides, intra-vehicle width rotating type construction machine wherein an upper rotating body is completely rotatable within the width of a lower travel body, such as the conventional back hoe, and rear end intra-vehicle width rotating type construction machines wherein only the rear end of an upper rotating body is rotatable within the width of a lower travel body, are popular in recent years in which construction works carried out in narrow places such as those in cites occupy a considerable proportion of all the construction works. However, from the nature of the machines, it is required to increase the weight of a counterweight attached to the rear end of upper rotating body in order to ensure stability. To meet this requirement, such a counterweight as extends up to near the height of the engine hood is sometimes mounted. In a construction machine having such a counterweight, it is necessary to use a guard for covering between the front edge of the counterweight and the cabin. If the front edge of the counterweight is extended up to near the rear edge of the cabin, the function as the guard may be fulfilled. In this case, however, a sideways portion of the rotating center, where the counterweight is less influential, becomes heavier and therefore, the weight of the machine body increases to an unnecessary extend, thus giving rise to a problem also from the point of transportability of the machine body.

SUMMARY OF THE INVENTION

According to the present invention, in view of the above-mentioned problems, there is provided, in the first aspect of the invention, a construction machine having a cabin and such devices as a power source and hydraulic devices which are mounted on the body of the machine. The cabin has a guard portion formed by extending a side wall of the cabin. The guard portion extends up to a sideways position of devices disposed behind the cabin. Since the devices disposed behind the cabin can be covered at least sideways by the guard portion, it is not necessary to separately provide a guard or the like for covering the mounting space of those devices, resulting in that the number of components used (including a support member for mounting the guard, etc. and clamp members such as bolts) can be reduced and it is possible to improve the productivity. It is also possible to drive away an anxiety about strength such as a possible damage to the guard (for example a crack caused by stress concentration on the mounted portion of the guard to the support member) which is attributable to impact or vibration during operation or travel of the construction machine. Moreover, it is possible to diminish joint portions, such as cabin side wall-guard joint and guard-counterweight joints, which look poor in the machine appearance, and thereby make the machine appearance more beautiful.

In the second aspect of the present invention there is provided, in combination with the construction machine in the above first aspect, a construction machine wherein a lower portion of the rear wall of the cabin is recessed toward the inside of the cabin to define a space, the foregoing devices are disposed so as to be located at least partially within the said space, and the guard portion closes sideways of the said space. According to this construction, a mounting space for the devices can be endured in the lower portion of the cabin rear wall as in the prior art. This is advantageous to such a construction machine as a small-sized hydraulic excavator wherein devices are compelled to be disposed in a narrow space. Besides, the guard so far used for covering the said space is no longer required. Thus, not only similar functions to those in the above first aspect can be attained, but also since the aforesaid space is covered by the cabin at least partially from above, the entry of raindrops is prevented and the devices are protected.

In the third aspect of the present invention there is provided, in combination with any of the above construction machines, a construction machine wherein a rear edge of the guard portion is formed in the vertical direction in a side view of the machine body. According to this construction, the mating surfaces of the rear edge of the guard portion and a front edge of a counterweight mounted at a rear position of the machine body or of an engine hood are in the form of a straight line extending in the vertical direction, so that there is a margin in the required dimensional accuracy as compared with the case where the guard rear edge is formed in conformity with the shape of the cabin rear wall. Besides, the productivity is improved because both edges can be mated together easily.

In the fourth aspect of the present invention there is provided, in combination with any of the above construction machines, a construction machine wherein the guard portion is provided with an upper guard portion extending backward beyond the rear end of the cabin rear wall up to a position above the devices disposed behind the cabin, the upper guard portion being contiguous to both the cabin rear wall and the upper edge of the guard portion. According to this construction, the foregoing space can substantially be taken still larger. To be more specific, since the upper guard is extended integrally from the cabin, a still larger space for mounting the devices is ensured below the upper guard portion by both the rear lower portion of the cabin and the upper guard portion. The aforesaid functions of the present invention can be exhibited also in the case where the spacing between the cabin and the engine hood or the counterweight is large.

DETAILED DESCRIPTION OF PREFERRED EMBODIMENTS

Embodiments of the present invention will be described in detail hereinunder with reference to the accompanying drawings.

Figure 1:
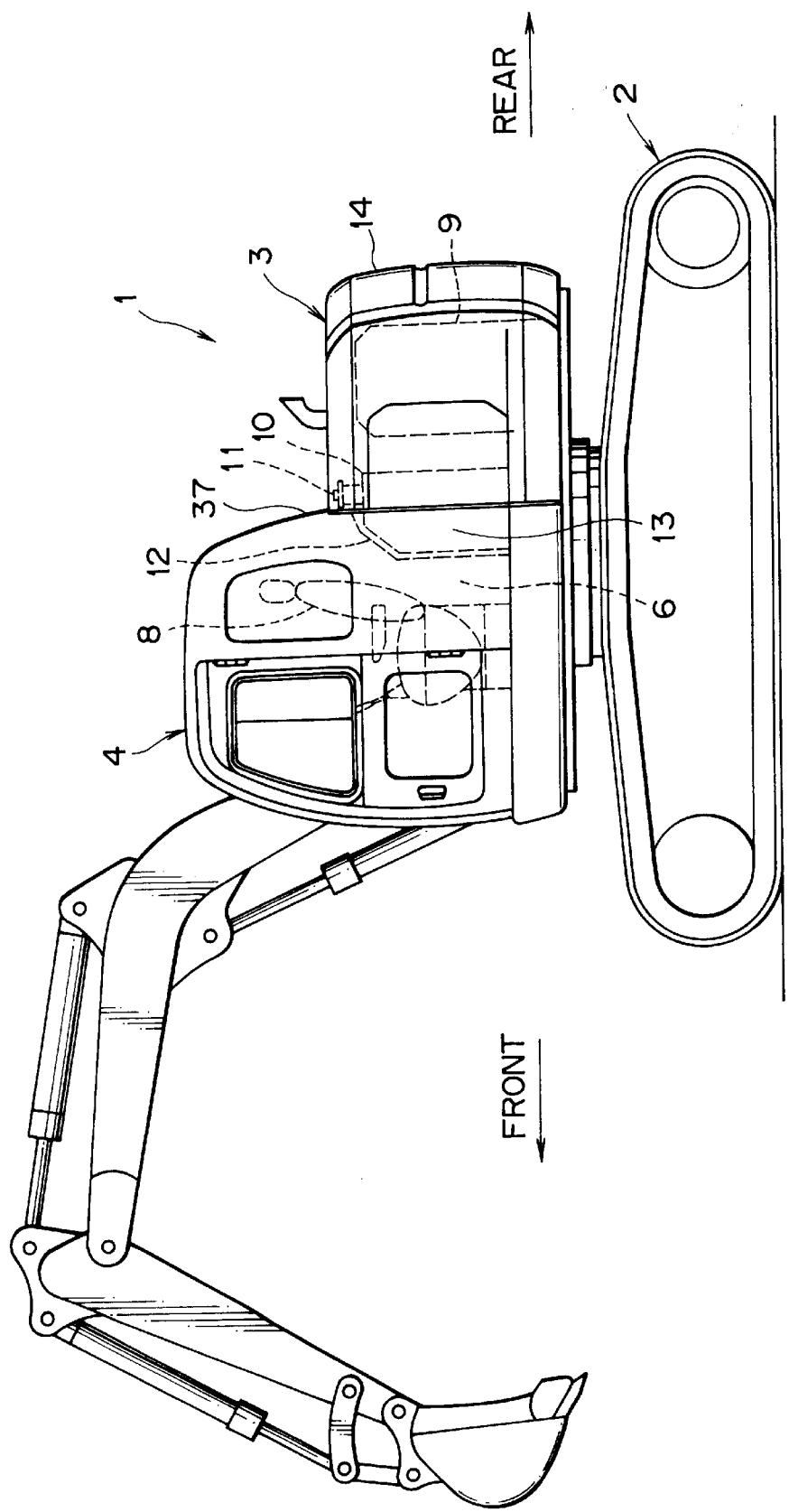
FIG. 1 is a side view of a hydraulic excavator according to an embodiment of the present invention.
Figure 2:
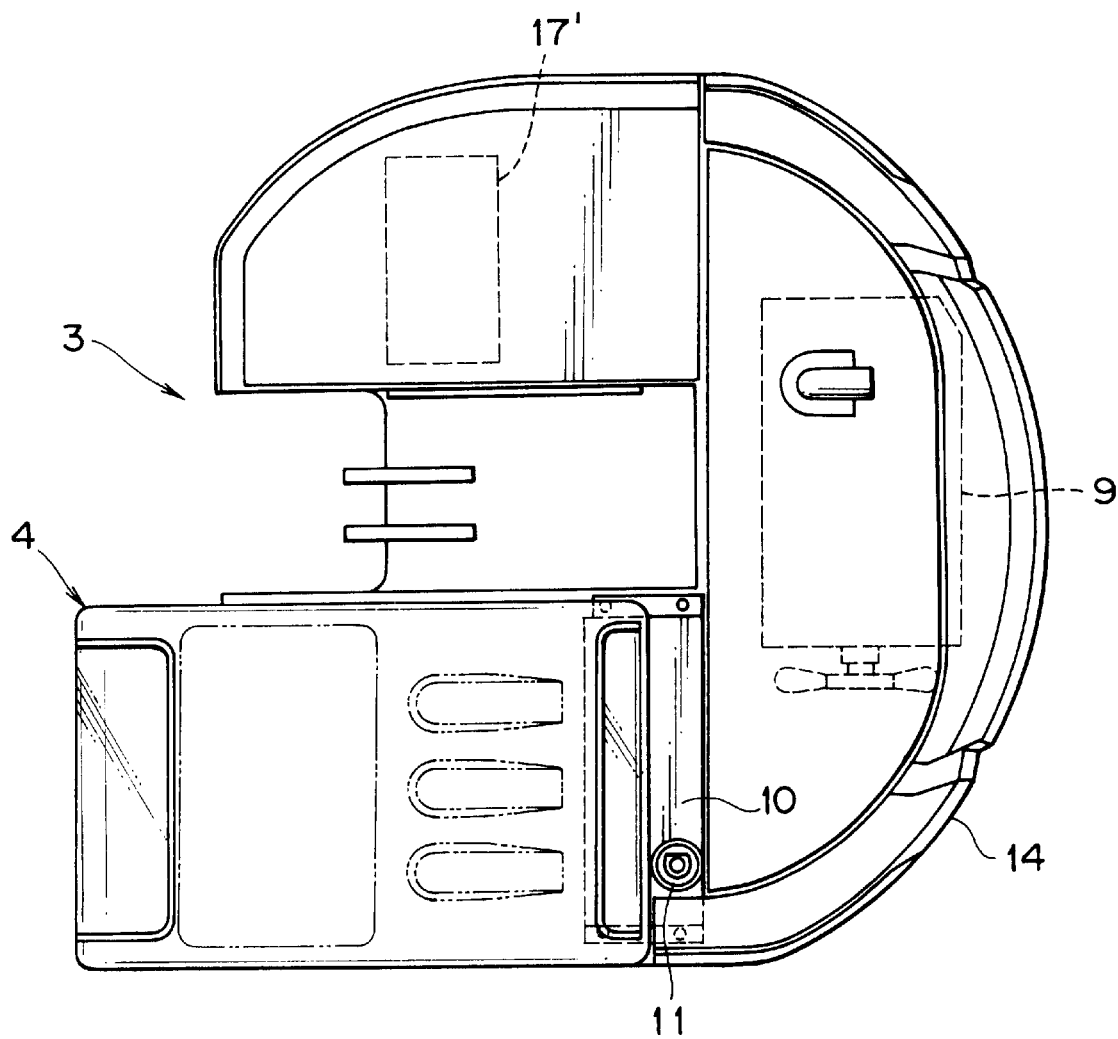
FIG. 2 is a plan view of an upper rotating body shown in FIG. 1.
Figure 3:
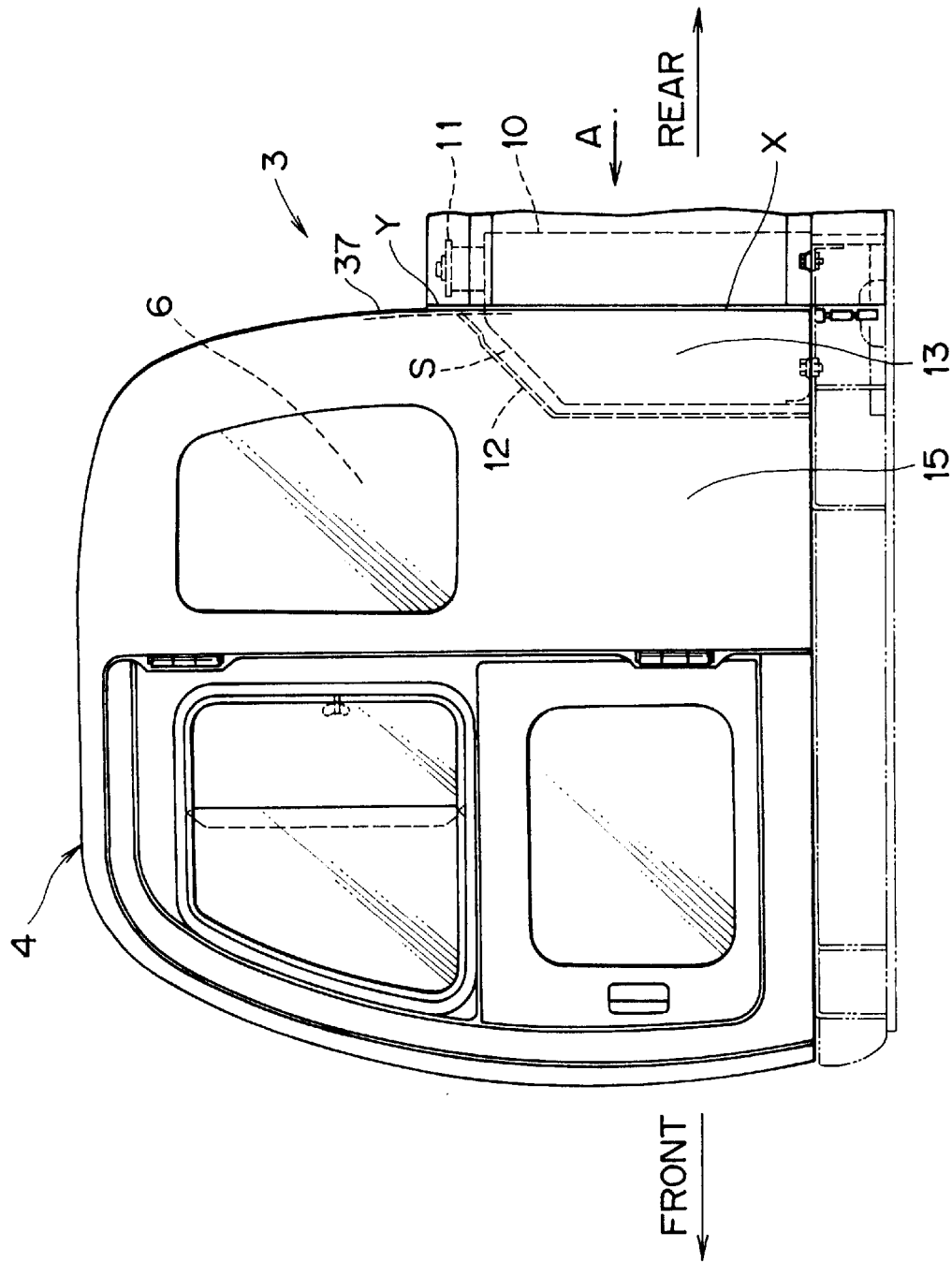
FIG. 3 is an enlarged view of a principal portion in connection with a cabin shown in FIG. 1.
Figure 4:
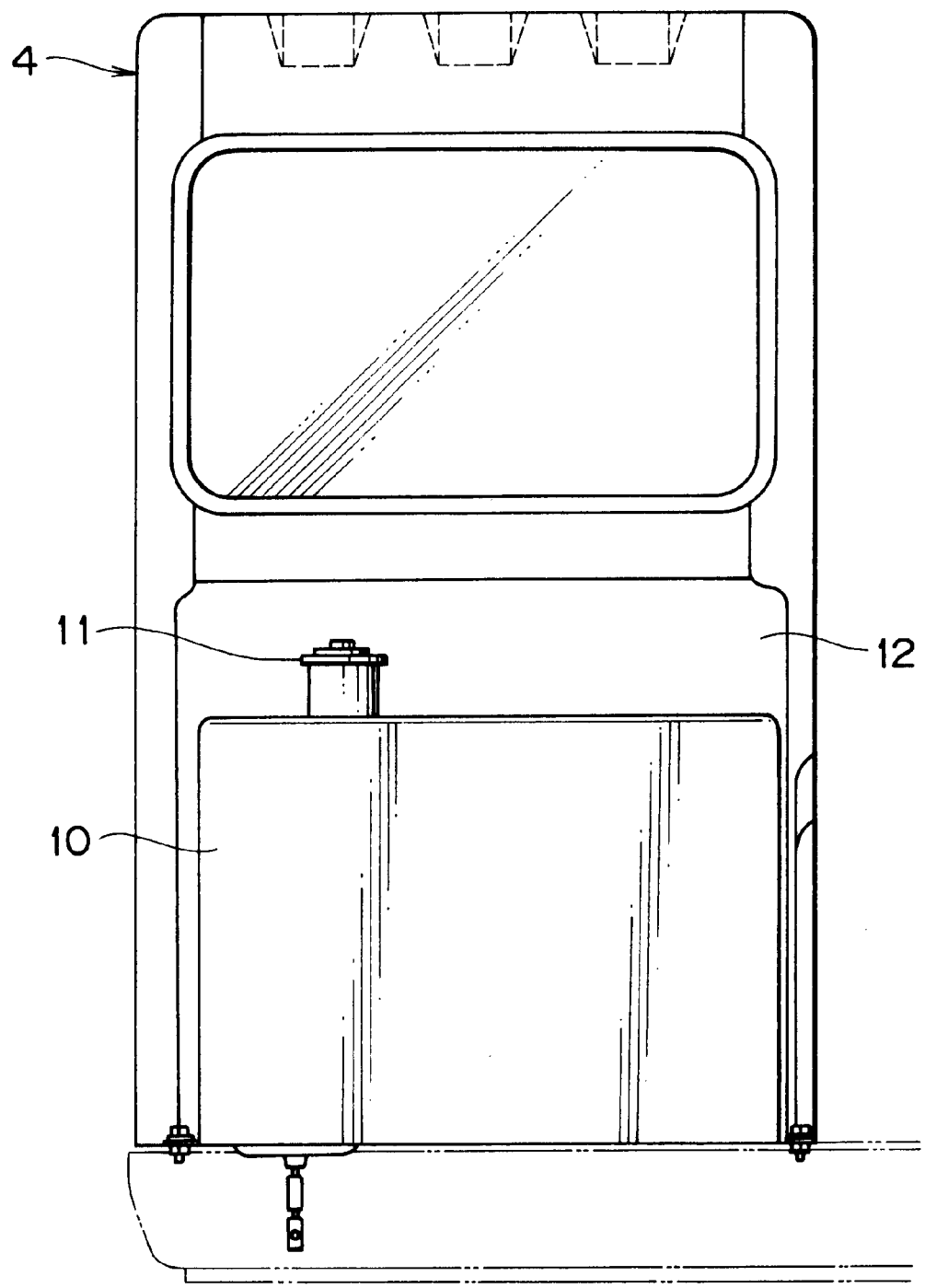
FIG. 4 is a rear view of the principal portion as seen in the direction of arrow A in FIG. 3.

FIG. 1 is a side view of a hydraulic excavator 1 as a construction machine according to an embodiment of the present invention. In the same figure, numeral 2 denotes a lower travel body of the hydraulic excavator 1, numeral 3 denotes an upper rotating body connected to the top of the lower travel body 2, numeral 4 denotes a cabin mounted on the upper rotating body 3, numeral 13 denotes a guard portion formed by extending a side wall of the cabin 4, numeral 6 denotes an operator room formed inside the cabin 4, numeral 8 denotes an operator seat disposed within the operator room, numeral 9 denotes an engine mounted on a rear portion of the upper rotating body, numeral 10 denotes a fuel tank, numeral 11 denotes an oil supply port of the fuel tank 10, numeral 12 denotes a partitioning portion, which is formed by recessing the rear wall of the cabin 4 toward the inside of the cabin, and numeral 14 denotes a counterweight which is arcuate in plan view and which is secured to the rear portion of the upper rotating body. FIG. 2 is a plan view of the upper rotating body shown in FIG. 1. In FIG. 2, numeral 17' denotes a hydraulic oil tank. FIG. 3 is an enlarged view of a principal portion in connection with the cabin 4 shown in FIG. 1. In FIG. 3, numeral 15 denotes a side wall of the cabin 4. FIG. 4 is a rear view of the principal portion as seen in the direction of arrow A in FIG. 3.

With reference to FIGS. 1 to 4, description is now directed to the construction and operation of the hydraulic excavator 1 of this embodiment. In this embodiment, the cabin 4 mounted on the upper rotating body 3 has the guard portion 13 formed by extending the side wall 15 (shown in FIG. 3) of the cabin 4 backward. The guard portion 13 extends up to a sideways position of, for example, the fuel tank 10 out of devices disposed behind the cabin 4. With the guard portion 13, at least a sideways portion of the fuel tank 10 disposed behind the cabin 4 can be covered, thus requiring no separate provision of a guard portion for covering the mounted space of the fuel tank 10 behind the cabin 4, whereby the number of components (including a support member for mounting the guard, etc. and clamp members such as bolts) can be reduced and it is possible to improve the productivity. Besides, even an anxiety about strength such as a possible damage (for example a crack caused by stress concentration on the mounted portion of the guard to the support member) to the guard (the foregoing separately provided guard) which is ascribable to impact or vibration during operation or travel of the hydraulic excavator 1. Moreover, it is possible to diminish joint portions of the upper rotating body 3, such as cabin side wall-guard joint and guard-counterweight joint in a conventional like excavator which joints deteriorate the appearance of the upper rotating body, and hence it is possible to improve the appearance of the upper rotating body.

Further, as shown in FIG. 3, lower portion of a rear wall 37 of the cabin 4 is recessed toward the inside of the cabin to form a space S. The fuel tank 10 is disposed so as to be positioned in the space S at least partially and the space S is closed sideways by the guard portion 13. Thus, as in the prior art, a mounting space for devices such as the fuel tank 10 can be ensured in a lower portion behind the cabin 4. This is advantageous to such a construction machine as a small-sized hydraulic excavator wherein devices are compelled to be disposed in a narrow space. Besides, the guard so far separately provided to cover the space S is no longer required, thus giving rise to the same function as above. Additionally, since the portion above the space S is covered at least partially by the cabin 4, the entering of raindrops or the like is prevented and the fuel tank 10 and other devices are protected from contact with external obstacles.

As shown in FIG. 3, moreover, a rear edge "X" of the guard portion 13 is formed in the vertical direction when seen sideways of the machine body. In this case, the mating surfaces of the rear edge "X" and a front edge of the counterweight 14 (shown in FIGS. 1 and 2) mounted at a rear position of the machine body, (or a front edge of an engine hood not shown), are in the form of a straight line extending in the vertical direction, so that there is a margin in the required dimensional accuracy as compared with the prior art wherein the mating surfaces are in conformity with the rear wall shape of the cabin, besides, the edges can be mated together easily, with consequent improvement of productivity.

Figure 5:
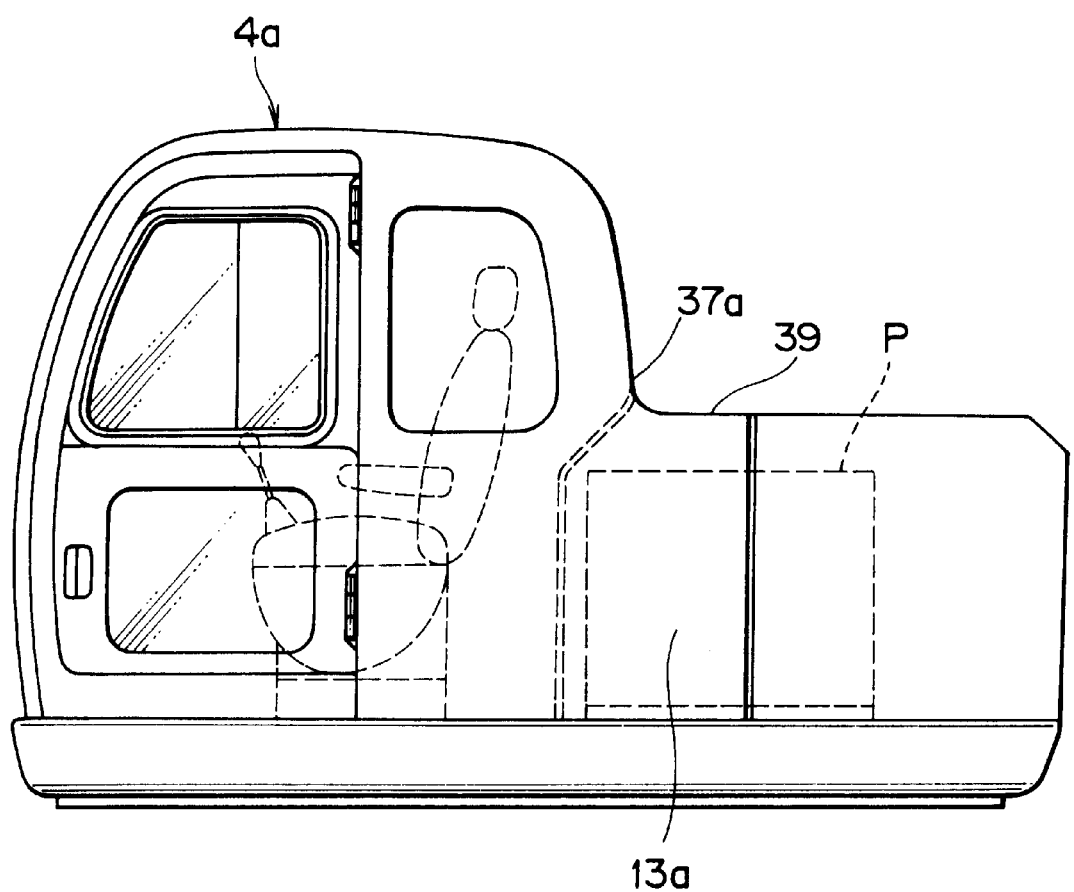
FIG. 5 is a side view showing another example of a cabin in an upper rotating body used in the embodiment.

FIG. 5 is a side view showing another example of a cabin 4a used in the upper rotating body according to this embodiment. In the same figure, a side wall of the cabin 4a is extended backward to constitute a guard portion 13a. The guard portion 13a has an upper guard portion 39 which is extended backward from a rear end of a rear wall 37a of the cabin 4a up to a position above devices P (devices in hydraulic equipment) disposed behind the cabin 4a and which is contiguous to both the rear wall 37a and an upper edge of the guard portion 13a. According to this construction, the space S can be substantially taken larger. In more particular terms, since the upper guard portion 39 is extended integrally from the cabin 4a, a still larger mounting space for devices is defined behind the lower portion of the cabin 4a and below the upper guard portion 39. Even where the cabin 4a and, for example, engine hood or counterweight are spaced apart from each other, the effect of this embodiment can be exhibited.

Figure 6:
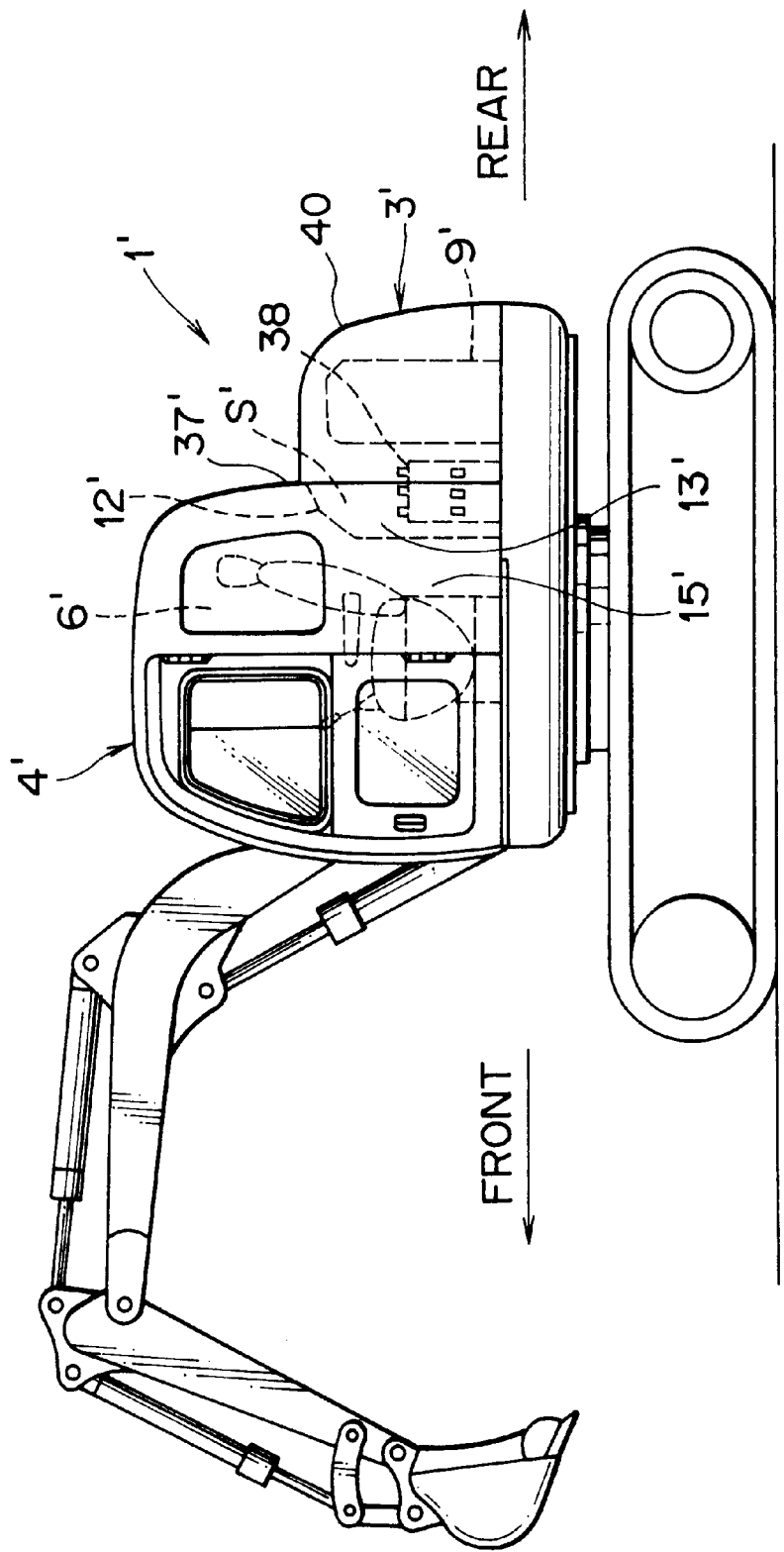
FIG. 6 is a side view of a hydraulic excavator according to another embodiment of the present invention.
Figure 7:
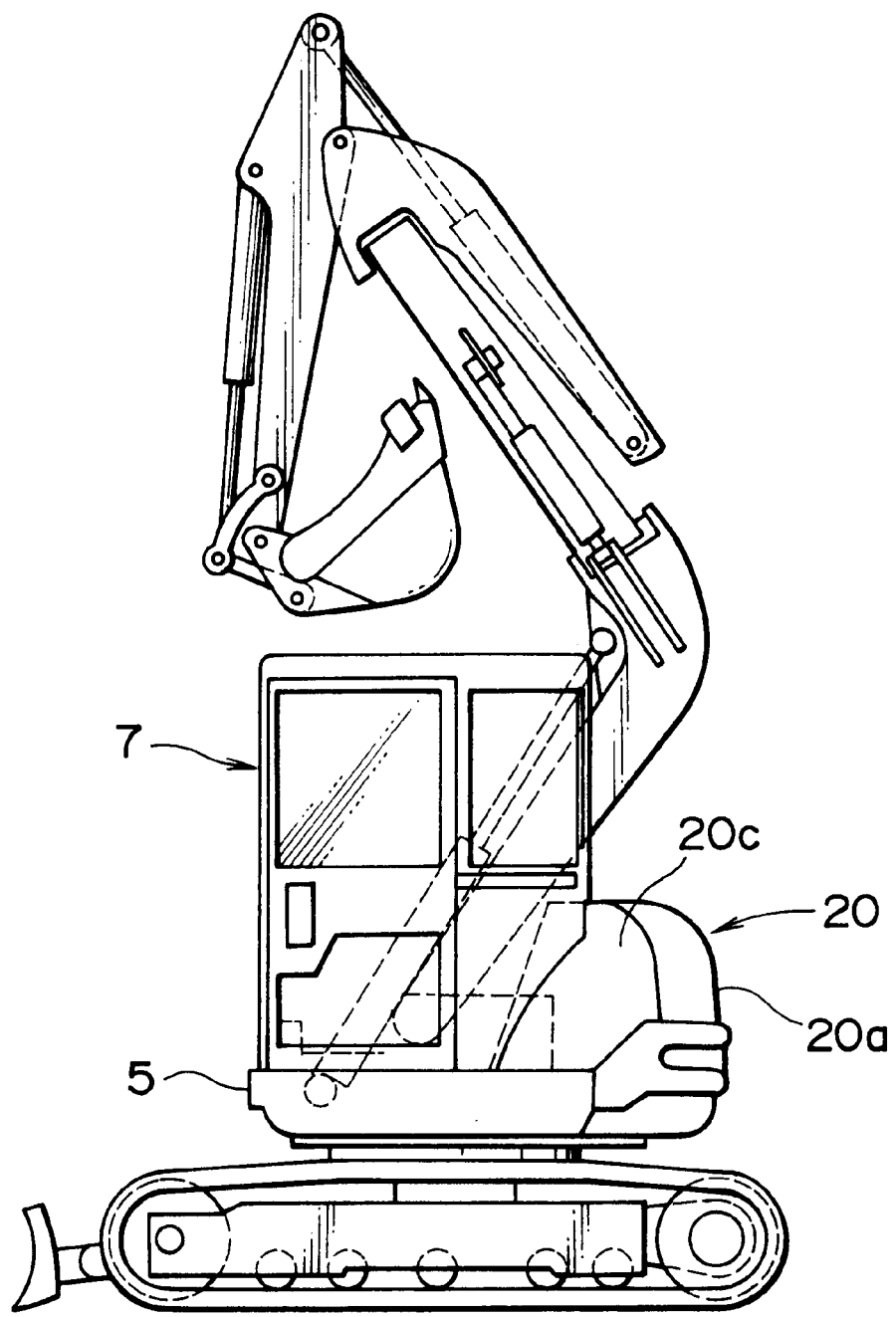
FIG. 7 is a side view showing the whole of a conventional back hoe.
Figure 8:
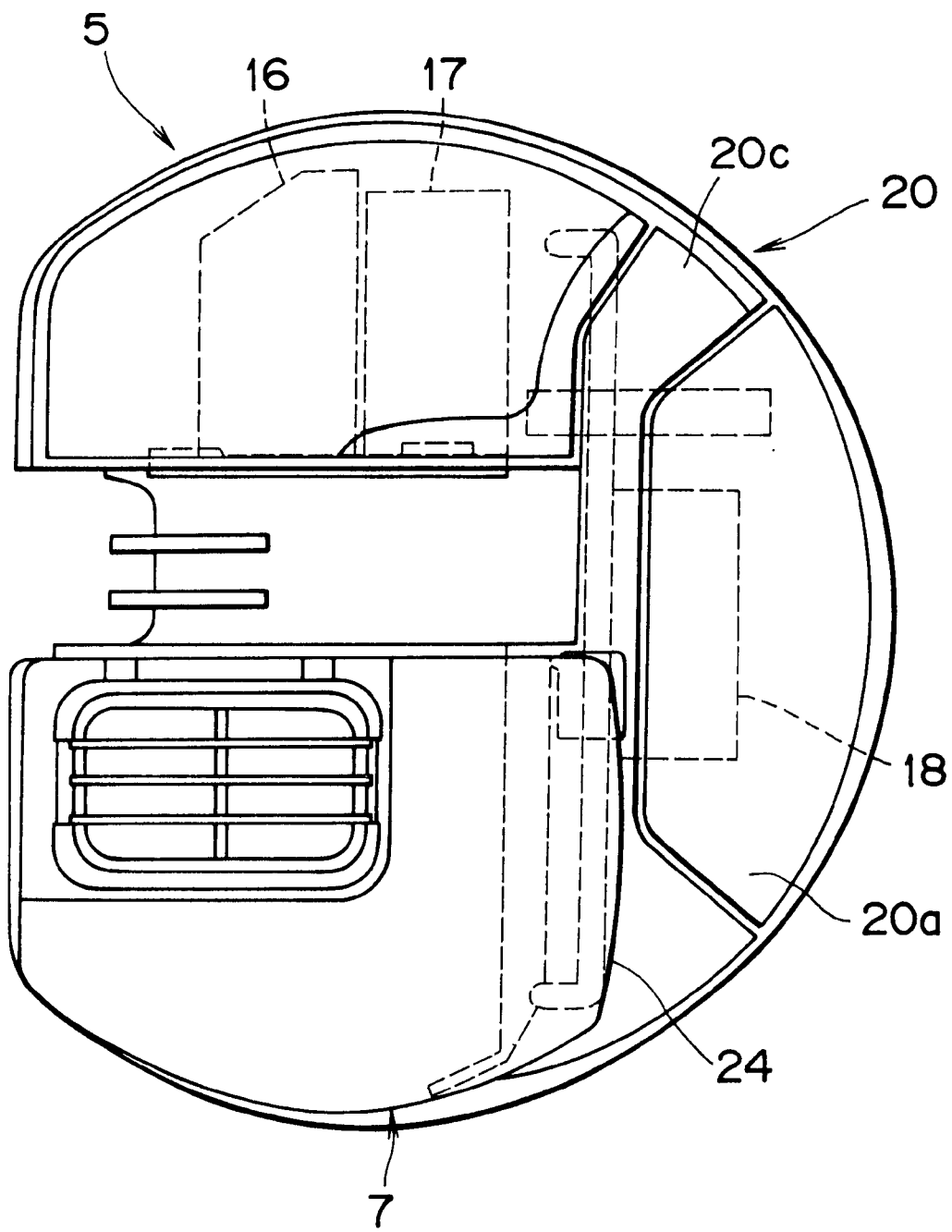
FIG. 8 is a plan view of a rotating base shown in FIG. 7.
Figure 9:
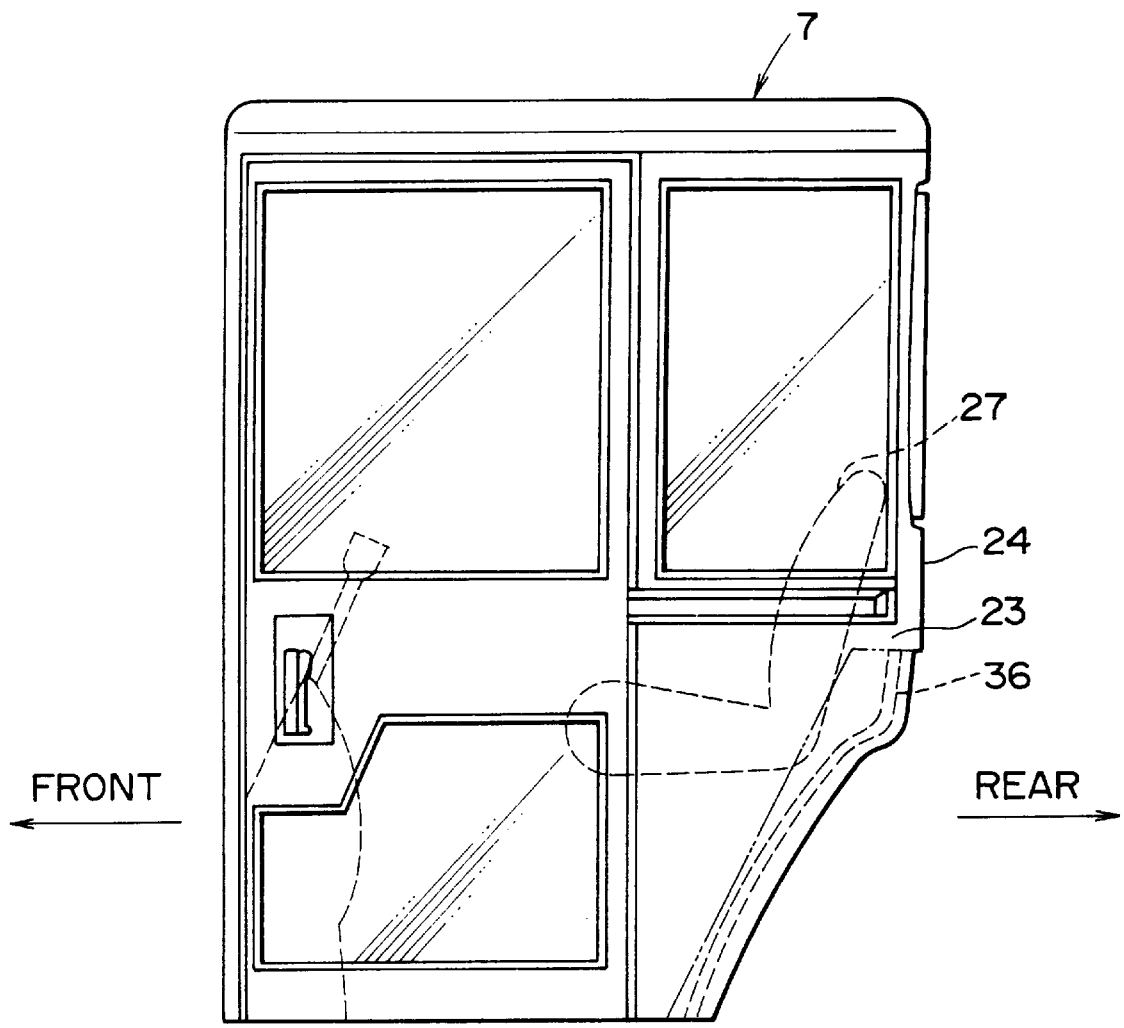
FIG. 9 is a left side view of a cabin shown in FIGS. 7 and 8.

FIG. 6 is a side view of a hydraulic excavator 1' according to another embodiment of the present invention. In the same figure, numeral 3' denotes an upper rotating body of the hydraulic excavator 1', numeral 4' denotes a cabin mounted on the upper rotating body 3', numeral 13' denotes a guard portion formed by extending a side wall 15' of the cabin 4' backward, and numeral 12' denotes a partitioning portion located between an operator room 6' formed inside the cabin 4' and a space S' which will be described later. Further, numeral 38 denotes a control valve for controlling a hydraulic actuator mounted in the hydraulic excavator 1', numeral 9' denotes an engine, and numeral 40 denotes an engine hood. In the upper rotating body 3' shown in FIG. 6, as is the case with the upper rotating body shown in FIG. 1, the cabin 4' mounted on the upper rotating body 3' has the guard portion 13' formed by extending the side wall 15' of the cabin 4' backward and a lower portion of a rear wall 37' of the cabin is recessed toward the inside of the cabin to form the space S'. The guard portion 13' extends up to a sideways position of, for example, the control valve 38 out of the devices disposed behind the cabin so that the devices are positioned at least partially within the space S'. Thus, not only the devices mounting space is ensured but also an engine hood 40 can be opened and closed pivotally. Consequently, it is possible to dispense with the fixed hood 20c used in the conventional back hoe shown in FIG. 7.

According to the construction machine of the present invention, as set forth above, the devices disposed behind the cabin can be covered at least sideways by the guard portion formed by extending a side wall of the cabin backward. Therefore, it is not necessary to separately provide a guard or the like for covering the devices mounting space formed behind the cabin, whereby it is possible to reduce the number of components used and improve the productivity. Besides, an anxiety about strength such as damage of the guard caused by impact or vibration during operation or travel of the construction machine can also be driven away. Moreover, it is possible of diminish joint portions (for example, cabin side wall-guard joint and guard-counterweight joint) which causes the appearance of the machine body to be deteriorated, and thereby possible to improve the machine body appearance.

Moreover, in the case where the lower portion of the cabin rear wall is recessed toward the inside of the cabin to form a space and the aforesaid devices are disposed so as to be positioned at least partially in the said space, allowing the space to be closed sideways by the guard portion, it is possible to ensure a devices mounting space in the lower position of the cabin rear portion as is the case with the prior art. This is advantageous to such a construction machine as a small-sized hydraulic excavator in which the devices are compelled to be disposed in a narrow space. Besides, the guard so far separately provided for covering the said space is not longer required, thus giving rise to the same function as above. Additionally, since the portion above the said space is covered at least partially by the cabin, the entry of raindrops or the like is prevented and the devices are protected from contact with external obstacles.

In the case where the rear edge of the guard portion is formed in the vertical direction when seen sideways of the machine body, the mating surfaces of the rear edge of the guard portion and the front edge of the counterweight mounted at a rear position of the machine body or of the engine hood are in the form of a straight line extending in the vertical direction, so that there is a margin in the required dimensional accuracy as compared with the prior art in which the mating surfaces are in conformity with the shape of the cabin rear wall, besides, both such edges can be mated together easily, thus contributing to the improvement of productivity.

Further, in the case where there is formed the upper guard portion which is contiguous to the rear wall of the cabin and also to the upper edge of the guard portion and which is extended up to a position above the devices disposed behind the cabin, it is possible to substantially enlarge the foregoing space. In other words, since the upper guard portion is extended integrally from the cabin, a still larger space for mounting the devices is formed behind the lower portion of the cabin and below the upper guard portion. Even where the cabin and the engine hood or the counterweight are spaced apart from each other, the aforesaid space can be formed and utilized effectively.

What is claimed is:

1. A construction machine comprising:
   a rotatable base;
   a cabin mounted on the base and having two side walls;
   a construction implement mounted at a front side of the cabin; and
   at least one auxiliary device mounted on the base at a back side of the cabin,
   wherein both side walls of the cabin are extended behind at least a portion of the cabin to form guard portions covering side portions of said at least one auxiliary device, wherein a lower portion of a rear wall of said cabin is recessed toward an interior of said cabin to form a space whose sides are covered by said guard portions, and wherein said at least one auxiliary device is at least partly positioned in said space.

2. The construction machine of claim 1, wherein a rear edge of each of said guard portions is defined at a vertical extension of the rear wall of said cabin.

3. The construction machine of claim 1, further comprising an upper guard portion extended backward from a rear end of said cabin rear wall to a position above said at least one auxiliary device, said upper guard portion being contiguous to both said cabin rear wall and said guide portions.

4. The construction machine of claim 1, wherein said at least one auxiliary device comprises one of a power source and a hydraulic device.

* * * * *